Oct. 12, 1965
G. F. QUAYLE
3,211,248
STEERING AND TRACTION UNIT
Filed Jan. 21, 1964
3 Sheets-Sheet 1
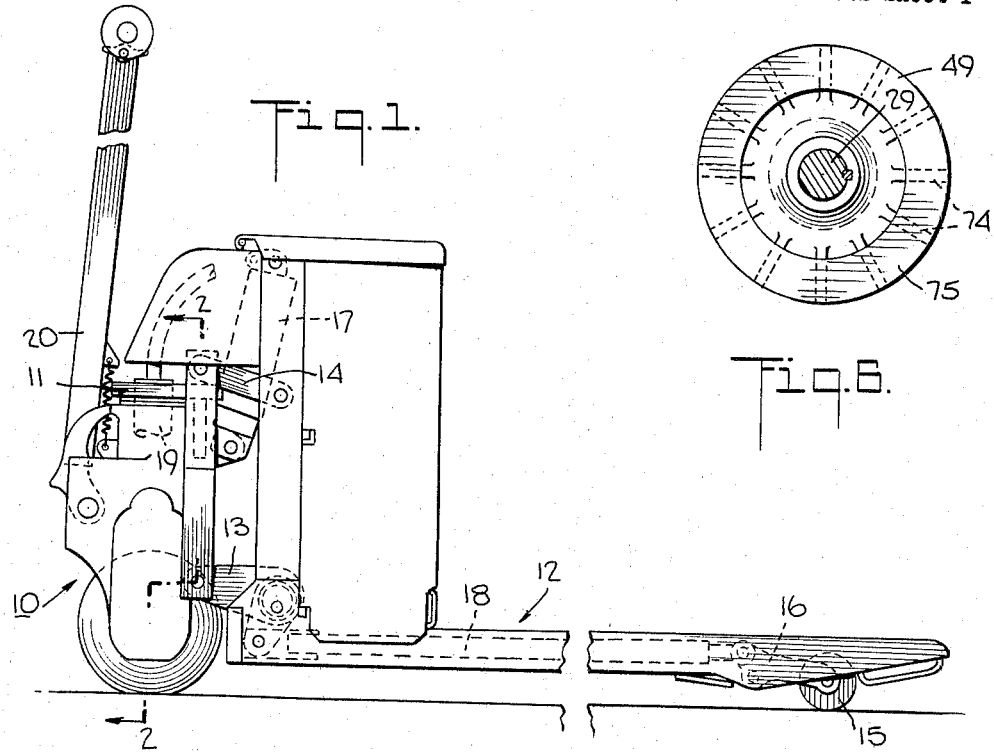
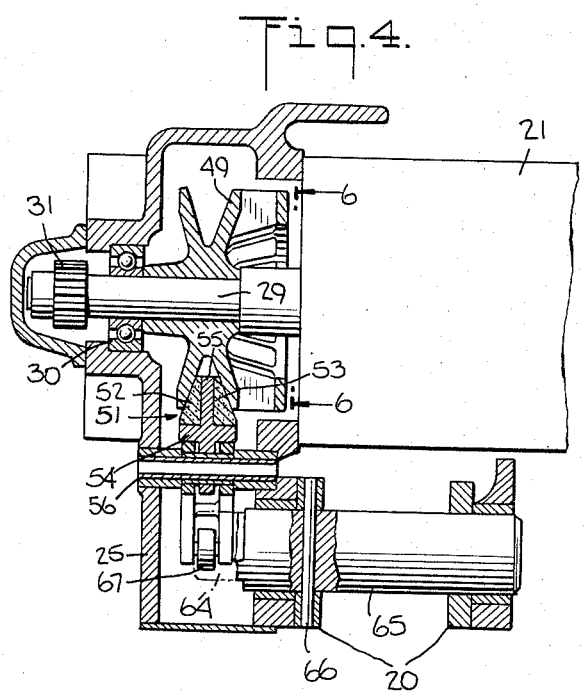
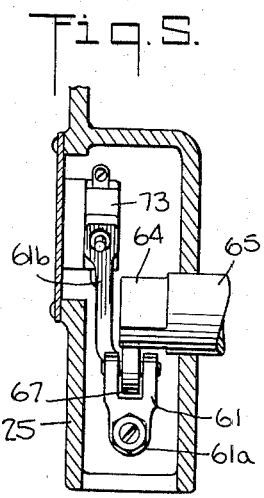
INVENTOR.
GEORGE F. QUAYLE
BY
ATTORNEY

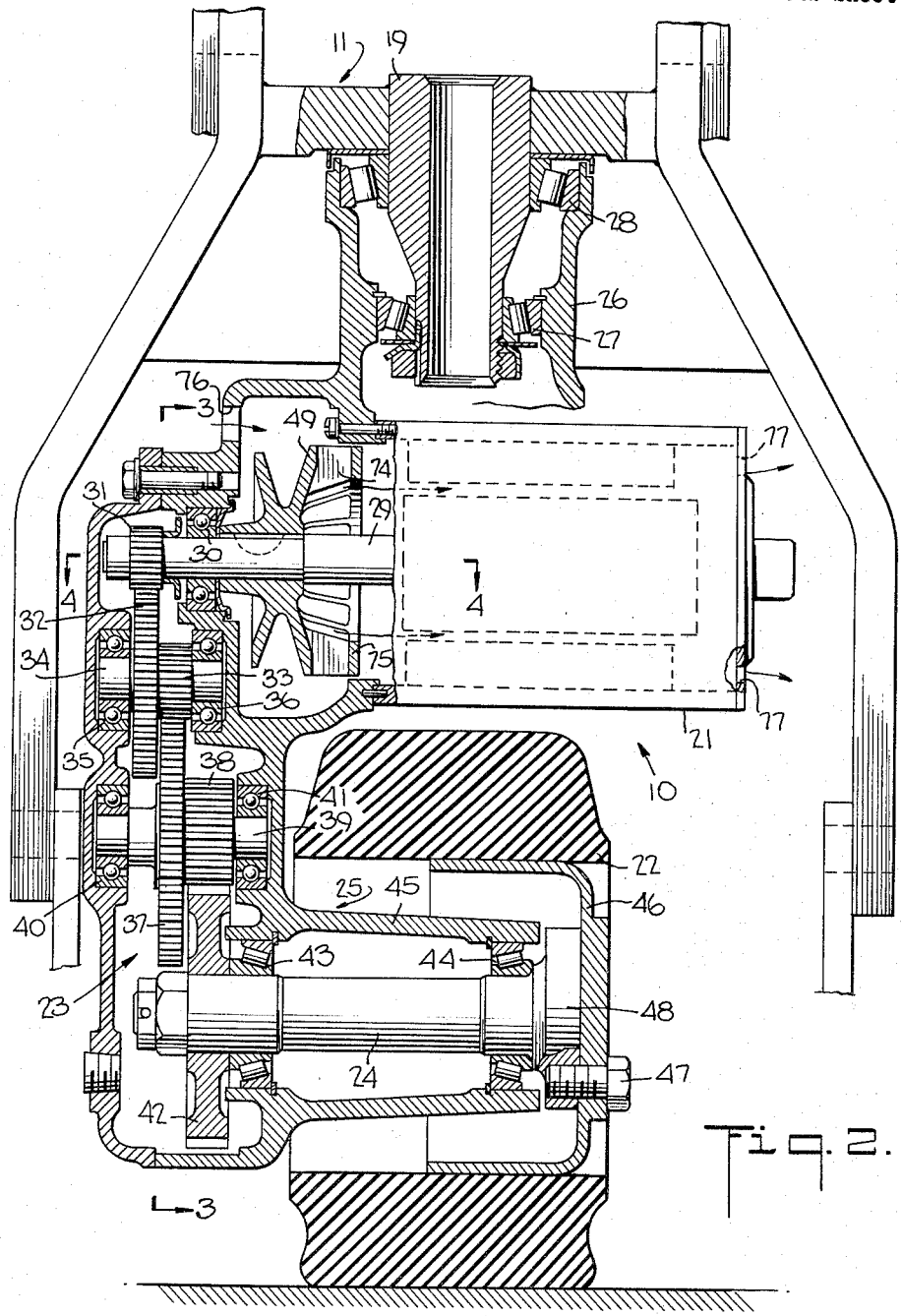

United States Patent Office 3,211,248
Patented Oct. 12, 1965

3,211,248
STEERING AND TRACTION UNIT
George F. Quayle, Philadelphia, Pa., assignor to Yale & Towne, Inc., New York, N.Y., a corporation of Ohio
Filed Jan. 21, 1964, Ser. No. 339,162
9 Claims. (Cl. 180—13)

This invention relates to an industrial truck of the type having a combined steering and traction unit mounted for steering rotation on the frame of the truck.

A conventional steering and traction unit for a truck of this type includes an electric drive motor and a traction wheel, together with a transmission through which the traction wheel is driven by the electric drive motor. In a so-called "walkie" type truck, the unit is adapted to be rotated relatively to the truck frame by an elongated steering handle which is pivotally attached to the unit to steer the truck, and in a "rider" type truck the unit is adapted to be rotated to steer the truck by means of a steering wheel mounted on the truck and suitably coupled to the combined steering and traction unit.

Such a unit also includes a brake arrangement for applying a braking force to the traction wheel. A commonly used form of brake arrangement includes a cylindrical brake drum mounted on the shaft of the electric traction motor, a pair of pivotally mounted brake shoes, each having suitable brake lining, and a heavy spring for pivoting the brake shoes toward the outer surface of the brake drum to press the brake linings against the surface of the drum to provide a braking force. In some arrangements a disc type brake is utilized. The brakes are released by pivoting or otherwise moving the brake shoes away from the brake drum or disc against the force of a brake spring. While such brake arrangements are effective, they are necessarily expensive and require considerable space in the steering and traction unit.

The purpose of this invention is to provide a steering and traction unit having an improved brake arrangement which is less expensive than those heretofore used and which requires less space in the unit, while providing more effective braking.

To this end, the brake arrangement of the invention includes a brake drum in the form of a V-groove pulley member and a pivotally mounted brake shoe having a V-shaped braking element which is adapted to be wedged into the V-groove of the pulley to provide a braking force. Because of the wedging action between the V-shaped lining and the V-groove of the brake drum, it has been found that the braking force that can be obtained with this arrangement is so great, that most applications, only a single brake shoe and lining is necessary to provide the desired braking force. This is in contrast to the prior arrangement in which two brake shoes and linings are required. This of course materially reduces the cost of the brake arrangement and the space required in the unit to accommodate the brake.

As a further feature of the invention, the V-groove pulley member is mounted on the shaft of the electric drive motor and is provided with integral fan blades or vanes so that as the pulley member is rotated by the shaft of the electric motor, air is forced through the motor by the fan blades to cool the motor and prevent overheating of the motor.

As a still further feature of the invention, control means are provided for breaking the electric traction circuit of the traction motor whenever the brakes are applied, thereby preventing overloading of the motor by the brakes.

As still a further feature, the invention includes the concept of utilizing a conventional belt driving pulley of the type frequently found on electric motors, so that the motor may be braked most effectively by the introduction of a V-shaped brake element into the pulley groove.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

FIG. 1 is a side elevational view of an industrial truck incorporating a combined steering and traction unit constructed in accordance with the invention;

FIG. 2 is a sectional view taken on the line 2—2 of FIG. 1;

FIG. 4 is a sectional view taken on the line 4—4 of FIG. 2;

FIG. 5 is a sectional view taken on the line 5—5 of FIG. 3; and

FIG. 6 is a view taken on the line 6—6 of FIG. 4.

Figure 3:
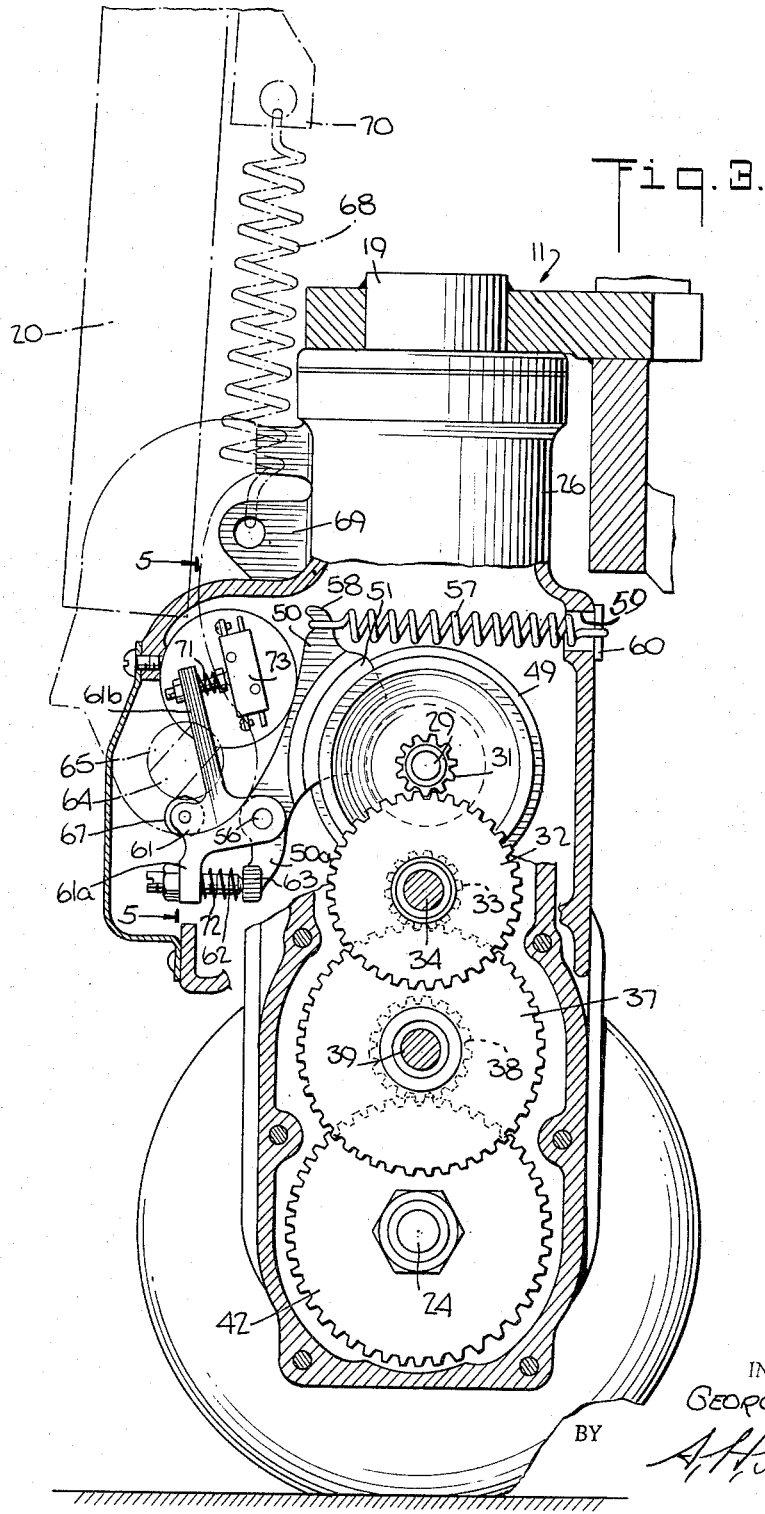
FIG. 3 is a sectional view taken on the line 3—3 of FIG. 2.

Referring to the drawings, and in particular to FIG. 1, there is shown a "walkie" type truck incorporating a steering and traction unit 10 constructed in accordance with the invention.

The particular truck illustrated is of the type shown in application Serial No. 322,181, filed November 7, 1963 and entitled Motorized Hand Truck It will be appreciated however that the steering and traction unit of this invention may be used in other types and styles of industrial trucks.

It is sufficient to an understanding of this invention to point out that the particular truck illustrated includes a main frame 11 and an elevating frame 12. One end of the elevating frame 12 is supported for vertical movement on the main frame 11 through parallel links 13 and 14, and the other end of the elevating frame 12 is supported by rollers 15 which are carried by pivotally mounted levers 16. A hydraulic ram 17 extends between the main frame 11 and the elevating frame 12, and when the ram 17 is extended the forward end of the elevating frame 12 is raised relatively to the main frame 11. At the same time the levers 16 are pivoted in a clockwise direction by links 18 so that the opposite end of the frame 12 is also raised while supported on the rollers 15.

The combined steering and traction unit 10 is mounted for steering rotation relatively to the main frame 11 through a downwardly extending king post 19, and the unit 10 is adapted to be rotated to steer the truck by an elongated steering handle 20 which is pivotally attached at its lower end to the steering and traction unit 10.

In utilizing the truck to pick up and transport a pallet supported load, the elevating frame 12, while in the lowered position shown in FIG. 1, is inserted through the pallet and the ram 17 then operated to raise the elevating frame 12 and lift the pallet a few inches from the floor. The pallet may then be transported on the truck through operation of the combined steering and traction unit 10.

Referring now to FIG. 2, the steering and traction unit 10 includes a horizontally disposed electric traction motor 21, a traction wheel 22 and a gear transmission 23 for transmitting power from the electric traction motor 21 to the traction wheel 22. The gear transmission 23 and a drive axle 24 for the traction wheel 22 are enclosed in a suitable housing 25, and the upper end of the housing 25 is provided with a hollow vertical extension 26 which supports bearings 27 and 28 that receive the king post 19 through which the unit 10 is mounted for steering rotation relatively to the main frame 11.

The electric traction motor 21 is secured to the housing 25 in a horizontal position above the traction wheel 22 and the drive shaft 29 thereof extends into the housing 25 and is supported by a bearing 30 provided within the housing.

The transmission 23 includes a pinion 31 which is secured to the end of the shaft 29 of the electric traction motor 21, a gear 32 and a pinion 33 which are secured to a shaft 34 mounted for rotation in bearings 35 and 36 within the housing 25, a gear 37 and a pinion 38 which are secured to a shaft 39 mounted for rotation in bearings 40 and 41 within the housing 25, and a gear 42 which is secured to the drive axle 24 of the traction wheel 22.

The drive axle 24 is mounted for rotation in bearings 43 and 44 provided in a hollow extension 45 of the housing 25. The traction wheel 22 surrounds the extension 45 and is mounted on a cylindrical cup 46 which is secured by a bolt 47 to a flange 48 provided on the end of the drive shaft 24. Operation of the electric traction motor 21, therefore, serves to drive the traction wheel 22 through the gear transmission 23.

In accordance with the invention, and in contrast to prior constructions, the brake arrangement for applying a braking force to the traction wheel 22 includes a V-groove pulley member 49, preferably secured to the shaft 29 of the traction motor 21 as shown in FIG. 2, and a pivotally mounted brake shoe 50, best shown in FIG. 3, having an arcuate braking element 51 of generally V-shaped cross section which is adapted to be wedged into the V-groove of the V-groove pulley member 49 to provide a braking force. As shown in FIG. 4, the V-shaped brake element 51 is formed by a pair of triangular shaped members 52 and 53 formed of suitable brake lining material and bonded to a flange 54 and to the sides of a central web 55 formed as integral parts of the brake shoe 50.

Referring to FIG. 3, the brake shoe 50 is pivotally mounted on a shaft 56, which, as best shown in FIG. 4, is parallel to the drive shaft 29 of the electric traction motor 21 and is supported in the housing 25. The brake shoe 50 is pivoted toward the V-groove of the pulley member 49 to wedge the braking element 51 into the V-groove of the pulley member by a heavy brake spring 57 which is secured at one end to a hooked portion 58 at the free end of the brake shoe 50 and which extends at the other end through an opening 59 through the wall of the housing 25 and is anchored to the wall of the housing 25 by a pin or retainer 60.

As best shown in FIG. 3, the braking element 51 is adapted to be released from braking engagement with the sides of the V-groove pulley member 49 by counterclockwise rotation of a bell crank lever member 61. The bell crank lever member 61 is mounted for independent rotation on the shaft 56 and has a screw 62 threaded through a downwardly extending leg 61a thereof which is adapted to engage a boss 63 provided on the end of a downwardly extending extension 50a of the brake shoe 50. Counterclockwise rotation of the bell crank lever 61 forces the end of the screw 62 against the boss 63 causing counterclockwise rotation of the brake shoe 50 about the shaft 56 against the force of the brake spring 57, to thereby move the braking element 51 out of braking engagement with the sides of the groove of the V-groove pulley member 49.

In the particular truck illustrated, rotation of the bell crank lever member 61 is controlled by the position of the steering handle 20. Thus, when the steering handle 20 is in the vertical position, as shown in FIG. 3, or in a horizontal position, the braking element 51 is held in braking engagement with the V-groove in the pulley member 49 by the spring 57. When the handle 20 is in any position between the vertical position and the horizontal position the brake element 51 is released from braking engagement with the sides of the V-groove of the pulley member 49.

The braking element 51 is so released by movement of the handle 20 by means of a cam 64 formed on the end of the pivot shaft 65 through which the handle 20 is pivotally attached to the steering and traction unit 10. As shown in FIG. 4, the handle 20 is secured to the pivot shaft 65 by a pin 66 so that the pivot shaft 65, and the cam 64 formed on the end thereof, are rotated by pivotal movement of the handle 20. When the handle 20 is in the vertical position, as shown in FIG. 3, a roller 67 mounted on the bell crank lever member 61 is released by the cam 64. When the handle 20 is pivoted downwardly from the vertical position the roller 67 is engaged by the outer peripheral surface of the cam 64 causing the bell crank lever member 61 to be rotated in a counterclockwise direction to release the braking element 51 from the V-groove of the pulley member 49. When the handle 20 reaches a substantially horizontal position, the roller 67 is again released by the cam 64 and the brake spring 57 again pivots the brake shoe 50 in the clockwise direction to effect braking engagement of the braking element 51 with the V-groove of the pulley member 49. Thus, the operator of the truck may quickly apply the brakes either by moving the handle to a substantially vertical position or a substantially horizontal position. When the truck is not in use, the handle 20 is held in the vertical position by a counterbalancing spring 68 which is secured at one end to an eye 69 which is secured to the housing 25 and is secured at the other end to an eye 70 which is secured to the handle 20.

As a preferred feature, the electric circuit of the traction motor is broken at the same time that the brakes are applied, to prevent overloading of the traction motor 21. To this end, a switch actuating screw 71 is threaded through an upwardly extending leg 61b of the bell crank lever member 61. When the brakes are applied, a compressed spring 72 surrounding the screw 62 and extending between the boss 63 on the extension 50a of the brake shoe 50 and the leg 61a of the bell crank lever member 61 rotates the bell crank lever member 61 in a clockwise direction causing switch actuating screw 71 to actuate a switch 73 to break the traction circuit to the motor 21. When the bell crank lever member 61 is rotated in a counterclockwise direction by pivotal movement of the handle 20, to release the brakes, the switch 73 is released by the switch actuating screw 71 to again establish the traction circuit to the traction motor 21.

As a further feature of the invention, the V-groove pulley member 49 is provided with integral vanes or blades 74, best shown in FIGS. 2, 3, 4 and 6, which extend from one side of the pulley 49 and are provided with an interconnecting reinforcing ring 75 at their outer ends. On rotation of the pulley 49 through operation of the traction motor 21, the vanes or blades 74 pull air through an opening 76 in the housing 25 and force the air through the traction motor 21 and out of openings 77 at the end of the housing of the motor 21, as indicated by the arrows in FIG. 2, thereby cooling and preventing overheating of the motor.

From the preceding description it can be seen that there is provided a very compact, relatively inexpensive combined steering and traction unit, made possible by a novel braking arrangement including a V-groove pulley and a V-shaped braking element. At the same time, very effective braking is provided through a wedging action of the braking element in the V-groove of the pulley member.

While one form of the invention has been shown and described, it will be appreciated that this is for the purpose of explanation and illustration and that changes and modifications may be made therein without departing from the spirit and scope of the invention.

I now claim:

1. In an industrial truck, a steering and traction unit mounted for steering rotation bodily relatively to said truck, said steering and traction unit including an electric motor having a drive shaft, a traction wheel, and a transmission housing having mounted therein a gear transmission interconnecting the drive shaft of said electric motor and the traction wheel whereby said traction wheel is driven by said electric motor, a V-groove pulley member connected to said drive shaft of said electric motor and mounted within said transmission housing for rotation by said electric motor, means associated with said V-groove pulley member for circulating cooling air through said motor, a V-shaped braking element, means mounting said braking element within said housing for movement into the V-groove of said pulley member, means mounted on said housing for moving said V-shaped braking element into wedging engagement with said V-groove of said pulley member to apply a braking force to said pulley member and therefore to said electric motor and traction wheel, and means for moving said V-shaped braking element out of wedging engagement with said V-groove to relieve the braking force.

2. In an industrial truck, a steering and traction unit mounted for steering rotation bodily relatively to said truck, said steering and traction unit including an electric motor having a drive shaft, a traction wheel, and a transmission housing having mounted therein a gear transmission interconnecting the drive shaft of said electric motor and the traction wheel whereby said traction wheel is driven by said electric motor, a V-groove pulley member connected to said drive shaft of said electric motor and mounted within said transmission housing for rotation by said electric motor, means associated with said V-groove pulley member for circulating cooling air through said motor, a V-shaped braking element, means pivotally mounting said braking element within said housing for movement into the V-groove of said pulley member, spring means mounted on said housing for moving said V-shaped braking element into wedging engagement with said V-groove of said pulley member to apply a braking force to said pulley member and therefore to said electric motor and traction wheel, and means for moving said V-shaped braking element out of wedging engagement with said V-groove against the force of said spring means to relieve the braking force.

3. In an industrial truck, a steering and traction unit mounted for steering rotation bodily relatively to said truck, said steering and traction unit including an electric motor having a drive shaft, a traction wheel, and a transmission housing having a gear transmission mounted therein for interconnecting the drive shaft of said electric motor and the traction wheel whereby said traction wheel is driven by said electric motor, a V-groove pulley member connected to said drive shaft of said electric motor and mounted within said transmission housing for rotation by said electric motor, a V-shaped braking element, means mounting said braking element within said housing for movement into the V-groove of said pulley member, means mounted on said housing for moving said V-shaped braking element into wedging engagement with said V-groove of said pulley member to apply braking force to said pulley member and therefore to said electric motor and traction wheel, means for moving said V-shaped braking element out of wedging engagement with said V-groove to relieve the braking force, and fan blades on said pulley member for circulating air to cool said electric motor.

4. In an industrial truck, a steering and traction unit mounted for steering rotation bodily relatively to said truck, said steering and traction unit including an electric motor having a drive shaft, a traction wheel, and a transmission housing having a gear transmission mounted therein for interconnecting the drive shaft of said electric motor and the traction wheel whereby said traction wheel is driven by said electric motor, a V-groove pulley member connected to said drive shaft of said electric motor and mounted within said transmission housing for rotation by said electric motor, means associated with said V-groove pulley member for circulating cooling air through said motor a V-shaped braking element, means mounting said braking element within said housing for movement into the V-groove of said pulley member, means mounted on said housing for moving said V-shaped braking element into wedging engagement with said V-groove of said pulley member to apply braking force to said pulley member and therefore to said electric motor and traction wheel, means for moving said V-shaped braking element out of engagement with said V-groove to relieve the braking force, and switch means within said housing actuated by movement of said V-shaped braking element into wedging engagement with said V-groove of said pulley member to break the traction circuit to said electric motor.

5. In an industrial truck, a steering and traction unit mounted for rotation bodily relatively to said truck, said steering and traction unit including an electric motor having a drive shaft, a traction wheel, and a transmission housing having a gear transmission mounted therein for interconnecting said drive shaft of said electric motor and said traction wheel whereby said traction wheel is driven by said electric motor, a V-groove pulley member operably mounted on said drive shaft of said electric motor, a V-shaped braking element, means mounting said braking element within said transmission housing for movement into the V-groove of said V-groove pulley member, means mounted in said housing for moving said V-shaped braking element into wedging engagement with said V-groove of said V-groove pulley member to apply a braking force to said pulley member and therefore to said electric motor and traction wheel, actuating means mounted within said housing and operably connected to said steering unit and said V-shaped braking element for moving said V-shaped braking element out of engagement with said V-groove to relieve the braking force, and means associated with said V-groove pulley member for circulating cooling air through said electric motor.

6. In an industrial truck of the character described in claim 5 wherein said V-shaped braking element comprises an arcuate shoe having a centrally located rib with brake lining members secured to opposite side of said rib, said brake lining members having a tapered surface which conforms to the V-groove in said V-groove member, whereby said brake lining members engage opposite sides of said V-groove when said V-shaped braking element is moved into engagement with said V-groove member.

7. In an industrial truck of the character described in claim 5 wherein said means for moving said V-shaped braking element into wedging engagement with said V-groove comprises a brake shoe which is pivotally mounted about its lower end, said brake shoe having a hooked portion at its uppermost end and biasing means attached to said hooked portion thus urging said braking element into engagement with said V-groove member.

8. In an industrial truck of the character described in claim 7 wherein said actuating means for moving said V-shaped braking element out of engagement with said V-groove comprises a pivotally mounted bell crank member, roller means attached to said bell crank member, cam means engaging said roller means and actuated by said steering unit, adjustable means attached to the lower end of said bell crank member and engaging the lowermost end of said brake shoe whereby the actuation of said cam means by said steering unit urges said bell crank member in a direction such that said biasing means is overcome and said brake shoe is urged out of engagement with said V-groove member.

9. In an industrial truck of the character described in claim 5 wherein said means associated with said V-groove pulley member for circulating cooling air through said electric motor comprises a plurality of vanes integrally mounted on said pulley member and cooperating apertures in said transmission housing and said motor housing whereby cooling air is drawn by said rotating vanes on said pulley member through said transmission housing apertures and forced through said motor and out through said apertures in said motor housing.

References Cited by the Examiner

UNITED STATES PATENTS

| | | | |
|---|---|---|---|
| 1,540,723 | 6/25 | Davis | 188—74 |
| 1,646,539 | 10/27 | Johnson | 188—166 |
| 2,325,396 | 7/43 | Hastings | 180—13 |
| 2,327,583 | 8/43 | Framhein | 180—65 X |
| 2,399,605 | 4/46 | Schroeder | 180—26 X |
| 2,478,327 | 8/48 | Schreck | 180—65 X |
| 2,645,297 | 7/53 | Wennberg et al. | 180—65 |
| 2,747,714 | 5/56 | Eason. | |
| 2,788,093 | 4/57 | Steinberg et al. | 180—13 X |
| 2,913,062 | 11/59 | Ulinski | 180—65 X |
| 2,942,679 | 6/60 | Gibson | 180—65 X |
| 2,950,773 | 8/60 | Ulinksi | 180—26 |
| 3,048,056 | 8/62 | Wolfram | 188—166 X |

MILTON BUCHLER, *Primary Examiner.*

KENNETH H. BETTS, *Examiner.*